April 15, 1924.
A. J. BASTIAN
1,490,194
APPARATUS FOR FORMING COIL RETAINING WEDGES
Filed July 30, 1920
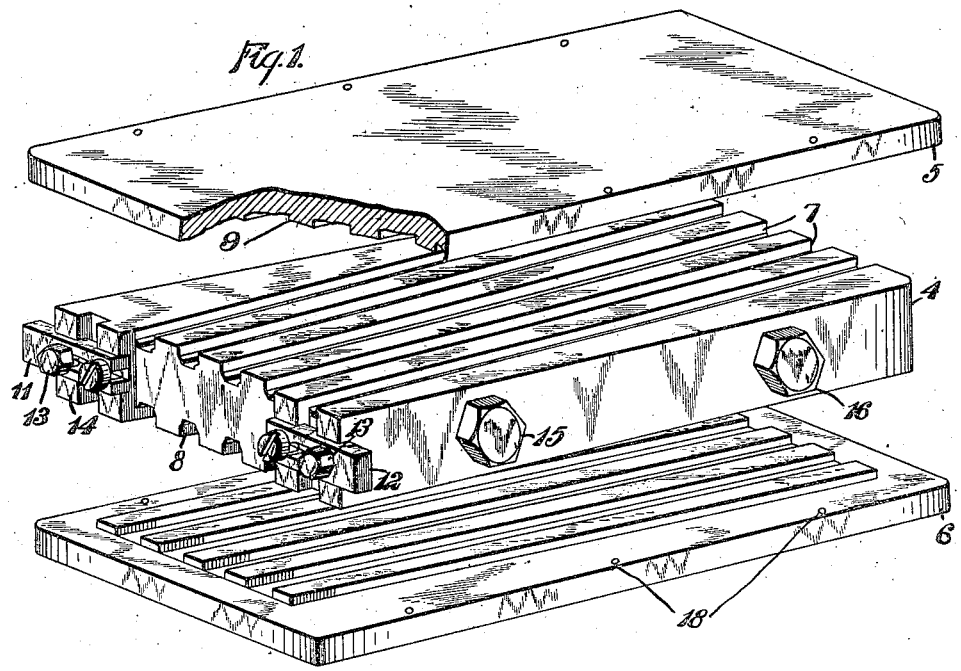
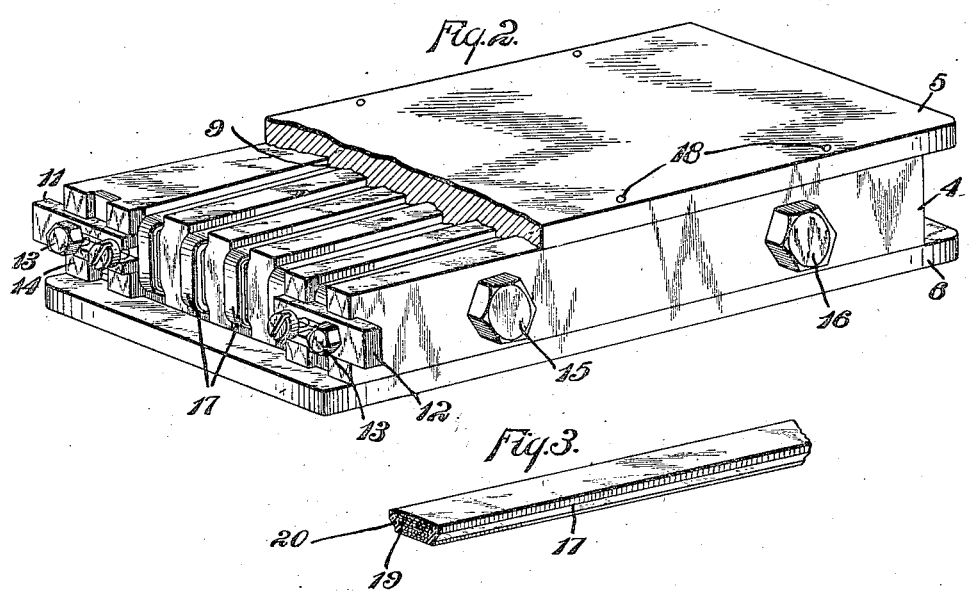
WITNESSES:
INVENTOR
ATTORNEY Patented Apr. 15, 1924.

1,490,194

UNITED STATES PATENT OFFICE.

ARTHUR J. BASTIAN, OF WILKINSBURG, PENNSYLVANIA, ASSIGNOR TO WESTINGHOUSE ELECTRIC & MANUFACTURING COMPANY, A CORPORATION OF PENNSYLVANIA.

APPARATUS FOR FORMING COIL-RETAINING WEDGES.

Application filed July 30, 1920. Serial No. 400,291.

*To all whom it may concern:*

Be it known that I, ARTHUR J. BASTIAN, a citizen of the United States, and a resident of Wilkinsburg, in the county of Allegheny and State of Pennsylvania, have invented a new and useful Improvement in Apparatus for Forming Coil-Retaining Wedges, of which the following is a specification.

My invention relates to apparatus for forming magnetic wedges which are used in dynamo-electric machines to retain the coils in their slots, and also to a method of forming such wedges, and it has for its object the provision of means whereby such wedges may be made much more rapidly and accurately than heretofore.

An example of the manner in which such wedges are used is shown in U. S. Patent to Field, 1,150,022, issued August 17, 1915.

In forming wedges of the character indicated above, the practice has been to manually assemble short lengths of wire and insulating strips, one-by-one, and then to compress them between two vertically divided half molds. This method was quite slow, and, because the material sometimes exuded slightly between the contracting surfaces of the mold members, such surfaces would not always meet completely, thus causing inaccuracy in the width of the finished wedge. By my invention, these objections are avoided. As shown in the accompanying drawing—

Fig. 1 is a perspective view of my apparatus partially assembled;

Fig. 2 is a similar view of the device in assembled position, with the top plate partially broken away, and Fig. 3 is a view of a short length of a wedge made by the apparatus of Figs. 1 and 2.

Referring particularly to Fig. 1, I provide a mold body 4 and top and bottom plates 5 and 6, preferably made of metal. In the top of the mold body, I provide angularly disposed channels 7, extending longitudinally thereof. In the bottom of the mold body, I provide channels 8, also extending in an angular direction longitudinally of the mold body but diverging from the angle taken by the channels 7. If these channels were extended around the end of the mold body they would form, in effect, a helix; that is, a tape wound around the mold body and following the channels would take a substantially helical course.

The top plate 5 has ribs 9 so disposed as to fit into the channels 7 when the plate is placed in operative position, and the bottom plate 6 has ribs 10 arranged to co-operate in a similar manner with the channels 8 on the under side of the mold body.

On the mold body 4, I provide clamps 11 and 12 adjustably held in place by screws 13 and 14, and bolts 15 and 16 extend transversely through the mold body, for a purpose to be hereinafter explained.

In forming coil-retaining wedges on the apparatus, the wires, and impregnated ribbons of cloth, are carried on spools mounted adjacent the wedge-forming apparatus. The mold body 4 is bolted to any suitable winding head or machine by the bolts 15 and 16. The ends of the wires and the insulating material to be embodied in the wedge are assembled in their proper order and the ends clamped in place on the mold body by the clamp 12. The winding machine is then started and the mold body 4 rotated until the wedge-forming material has completed its path of travel through the channels around the mold body. The wire and ribbon are then severed from the spools and the end of the portion carried on the mold body is clamped into place thereon by the clamp 11. The position of the strips of wedge material in the channels is indicated at 17 in Fig. 2.

The mold body is then removed from the winding head and the plates 5 and 6 placed thereon, as indicated in Fig. 2. The thickness of the material 17 is such as to permit actual contact between the plates 5 and 6 and the mold body 4, after such material has been fully compressed. The mold is then placed in the press and subjected to extremely heavy pressure and also to heat sufficient to melt the phenolic condensation product, such as bakelite with which the cloth surrounding the wires is impregnated, such heat usually being about 130° centigrade. The effect of the pressure and melting action combined is to fuse the wires and cloth into a solid mass capable of withstanding pressure.

The mold is then removed from the press and the top and bottom plates stripped therefrom, the holes 18 in the top and bottom plates being provided so that, if necessary, a separation may be made by stripping plate action. The wedge 17 may then be removed, either by unwinding it from the mold body or by cutting the coils at the ends of the mold block.

In Fig. 3 is shown a piece of a wedge made by the method just described. In the present case, the wedge is made up of three flat wires 19 interspersed with, and surrounded by, impregnated cloth 20. It will, of course, be obvious that the wires, instead of being flat, could be round, and that, instead of having cloth surrounding them individually, they could be placed directly against one another and have but one enveloping member surrounding them all. As shown in the drawing, the slots in the mold body are slightly wedge-shaped, but they might be made in other shapes if desired. Likewise, the mold body need not necessarily have the channels therein angularly disposed.

I claim as my invention:

1. In an apparatus for forming coil-retaining members, the combination of a mold body having substantially flat faces provided with channels therein for the reception of material to be compressed, and ribbed members co-operating with said channels to compress said material.

2. In an apparatus for forming coil-retaining members, the combination of a substantially flat mold body provided with channels in a plurality of its faces, such channels being angularly disposed in divergent directions on opposite faces of said mold body in such manner that, when a strip of material is wound around the mold body and in the channels, it will take a substantially helical course.

3. In an apparatus for forming coil-retaining members, the combination of a substantially flat mold body provided with channels in a plurality of its faces, such channels being angularly disposed in divergent directions on opposite faces of said mold body in such manner that, when a strip of material is wound around the mold body and in the channels, it will take a substantially helical course, and mold compressing members having angularly disposed ribs co-operating with said channels in the mold body.

4. In an apparatus for forming coil-retaining members, the combination of a mold body having substantially flat faces provided with channels therein for the reception of material to be compressed, and ribbed members co-operating with said channels to compress said material, said channels decreasing in width adjacent to their bottom walls.

5. In an apparatus for forming coil-retaining members, the combination of a mold body having substantially flat faces provided with recesses therein, ribbed plates cooperating therewith, and means on the mold body for holding the coil-retaining member being formed.

6. In an apparatus for forming coil-retaining members, the combination of a mold body having substantially flat faces provided with recesses therein, ribbed plates cooperating therewith, means on the mold body for holding the coil-retaining member being formed, and means for attaching the mold body to a winding head.

In testimony whereof, I have hereunto subscribed my name this 19th day of July 1920.

ARTHUR J. BASTIAN.